United States Patent
Müller et al.

(10) Patent No.: US 8,052,555 B2
(45) Date of Patent: Nov. 8, 2011

(54) CONICAL PULLEY WITH INTEGRATED TORQUE SENSOR FOR A BELT-DRIVEN CONICAL-PULLEY TRANSMISSION

(75) Inventors: Eric Müller, Kaiserslautern (DE); Reinhard Stehr, Bühl (DE); Ronald Glas, Obersasbach (DE)

(73) Assignee: LuK Lamellen und Kupplungsbau Betelligungs KG, Bühl (DE)

( * ) Notice: Subject to any disclaimer, the term of this patent is extended or adjusted under 35 U.S.C. 154(b) by 330 days.

(21) Appl. No.: 12/313,906

(22) Filed: Nov. 24, 2008

(65) Prior Publication Data

US 2009/0176607 A1 Jul. 9, 2009

Related U.S. Application Data

(60) Provisional application No. 61/004,106, filed on Nov. 23, 2007.

(51) Int. Cl.
*F16H 59/00* (2006.01)

(52) U.S. Cl. .......................................... 474/18; 474/28
(58) Field of Classification Search ............... 474/8, 18, 474/19, 28, 43, 45, 46; 477/45, 46
See application file for complete search history.

(56) References Cited

U.S. PATENT DOCUMENTS

| 6,277,043 | B1 * | 8/2001 | Friedmann | 474/18 |
| 6,322,466 | B1 * | 11/2001 | Eidloth | 474/8 |
| 6,361,456 | B1 * | 3/2002 | Walter | 474/18 |
| 6,506,136 | B2 * | 1/2003 | Schmid et al. | 474/18 |
| 2006/0105867 | A1 * | 5/2006 | Reuschel | 474/18 |
| 2007/0197322 | A1 * | 8/2007 | Faust | 474/28 |

* cited by examiner

*Primary Examiner* — William A Rivera
(74) *Attorney, Agent, or Firm* — Alfred J. Mangels

(57) ABSTRACT

A conical pulley assembly with integrated torque sensor. A torque-dependent force is transmitted through a transmitting component to a sensing piston whose position determines the pressure in a sensing chamber. The transmitting member is connected to the movable disk, and is formed in such a way that it transmits the torque-dependent force to the sensing piston in a manner that is dependent on the position of an axially movable disk of the conical pulley.

4 Claims, 3 Drawing Sheets

CONICAL PULLEY WITH INTEGRATED TORQUE SENSOR FOR A BELT-DRIVEN CONICAL-PULLEY TRANSMISSION

BACKGROUND OF THE INVENTION

1. Field of the Invention

The present invention relates to a conical pulley with an integrated torque sensor for use in a belt-driven conical-pulley transmission.

2. Description of the Related Art

Conical pulleys are manufactured in many types by the assignee of the present application. The integrated torque sensor is used to change, as a function of torque, a basic contact pressure with which a conical pulley pair bears against the endless torque-transmitting means that circulates between the conical disk pairs, so that an adjusting pressure for adjusting the transmission ratio of the belt-driven conical-pulley transmission can be reduced. It is advantageous if the torque-dependent pressure can also be modulated depending upon the transmission ratio, because a higher contact pressure force is necessary to transmit the torque reliably in the underdrive range than in the overdrive range. For transmission-ratio-dependent modulation of the torque-dependent contact pressure, it is known to modify the radial position of the rolling elements of the torque sensor as a function of the transmission ratio by having the rolling elements additionally supported on a ramp surface of the axially movable disk. In that way the effective range of the ramp surfaces can be modified as a function of the transmission ratio, whereby a pressure prevailing in the sensing chamber is modulated.

An object of the present invention is to provide a conical pulley with which it is possible to modulate the pressure in the sensing chamber as a function of the transmission ratio of the belt-driven conical-pulley transmission, and without complex and expensive shaping of the ramp surfaces of the torque sensor.

SUMMARY OF THE INVENTION

Briefly stated, in accordance with one aspect of the present invention, a conical disk pair is provided having an integrated torque sensor, and for use in a belt-driven conical-pulley transmission. The transmission includes a shaft with an axially fixed disk, and an axially movable disk that is non-rotatably carried the shaft. A drive element for introducing torque is connected to the shaft so that it is axially immovable and is rotatable relative to the shaft. The drive element includes a first ramp surface, and a second ramp component having a second ramp surface. The two ramp surfaces are separated by rolling elements. The second ramp component shifts axially relative to the shaft when there is a rotation relative to the drive element.

A support member is connected rigidly to the shaft. A sensing piston is situated between the second ramp component and the support member and is axially movable relative to the shaft. A sensing chamber is formed between the sensing piston and the support member and is supplied through an inlet with hydraulic fluid under pressure, and has an outlet whose effective cross section is modifiable as a function of the position of the sensing piston. For the transmission of the axial motion of the second ramp component relative to the sensing piston a transmitting component is attached to the axially movable disk and is so designed that a transmission ratio with which an axial force of the second ramp component is converted into an axial force of the sensing piston changes as a function of the axial position of the movable disk.

Advantageously, the transmitting component is a lever with an articulated connection to the axially movable disk and is formed in such a manner that the ratio of the distance between a point of contact of the transmitting component with the second ramp component and the articulated connection point to the distance between a point of contact of the transmitting component with the sensing piston and the articulated connection point changes as a function of the axial position of the movable disk.

The transmitting component can be attached to a cylinder that is rigidly connected to the axially movable disk. The cylinder has an inner surface and the support member is axially and sealingly seal displaceable along the cylinder inner surface.

BRIEF DESCRIPTION OF THE DRAWINGS

The structure, operation, and advantages of the present invention will become further apparent upon consideration of the following description, taken in conjunction with the accompanying drawings in which.

DESCRIPTION OF THE PREFERRED EMBODIMENTS

Figure 1:
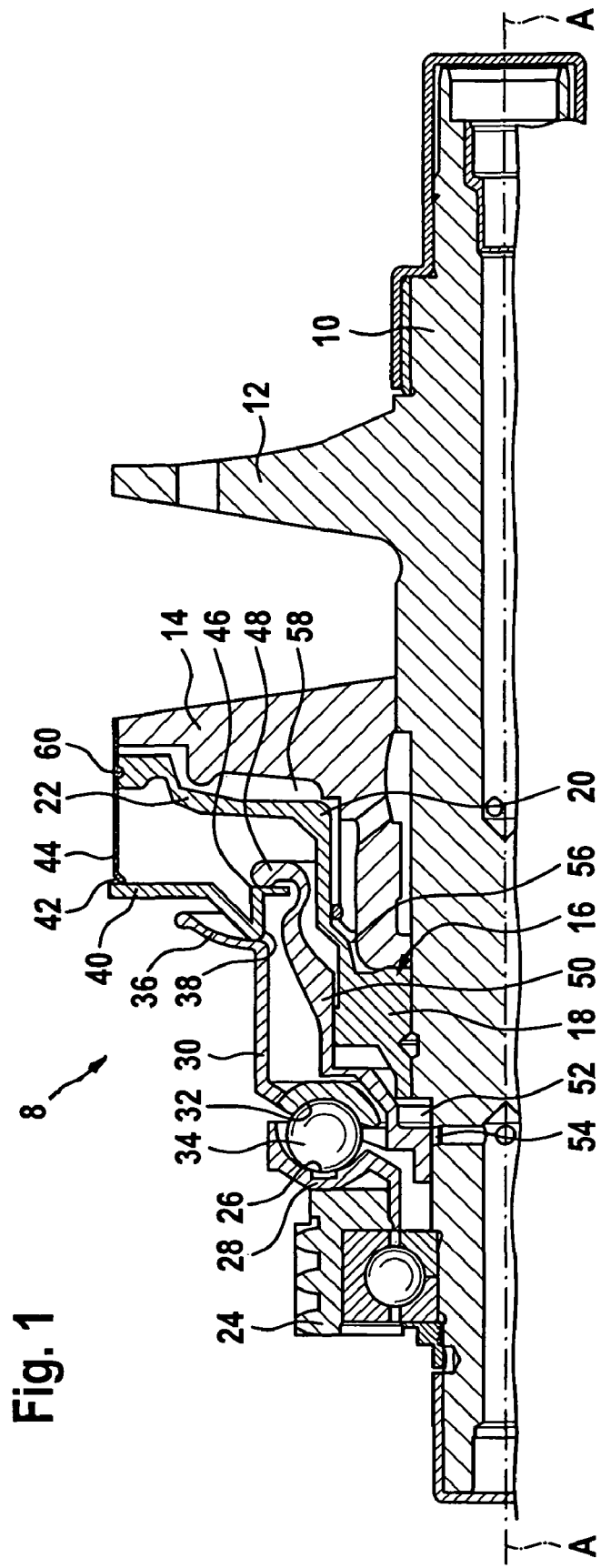
FIG. 1 is a half-sectional view of a conical pulley in accordance with an embodiment of the invention as part of a belt-driven conical-pulley transmission and in the underdrive range.

FIG. 1 shows a half-sectional view through an embodiment of a conical pulley assembly 8 in accordance with the present invention. The conical pulley assembly is rotatable about an axis A-A. A shaft 10 is preferably integrally formed with an axially fixed conical disk 12. An axially movable conical disk 14 is non-rotatably carried on shaft 10 by way of a splined connection. Conical pulley assembly 8 also includes a support member 16 that is rigidly connected to the shaft 10 at an attachment region 18, and has a cylindrical region 20 that begins at the attachment region 18 and terminates at a generally radially extending wall 22.

At the left end region of shaft 10 (with reference to FIG. 1), a rotatable but axially fixed drive wheel 24 is supported, to which a first ramp component 28 with a first ramp surface 26 is attached. A second ramp component 30 is axially spaced from first ramp component 28 and includes a second ramp surface 32 that faces first ramp surface 26 and that is axially movable relative to shaft 10. Situated between first and second ramp surfaces 26, 32 are rolling elements 34, for example balls.

At its right end region (with reference to FIG. 1), second ramp component 30 includes a support region 36 that extends generally radially. A transmitting component 40 includes a first support point 38 that bears against support region 36. Transmitting component 40 is in contact at a pivot point 42 with a cylinder 44 that is rigidly connected to axially movable disk 14, so that transmitting component 40 is tiltable about pivot point 42.

Transmitting component 40 also bears against a second support point 46 at a shoulder 48 of a sensing piston 50, which is sealingly movable relative to shaft 10 on attachment region 18 of support member 16. Sensing piston 50 bounds a sensing chamber 52 that is formed between sensing piston 50, attachment region 18 of support member 16, and shaft 10. Sensing chamber 50 is constantly filled with hydraulic fluid under pressure through a supply line (not shown) leading through shaft 10, and from which an outlet opening 54 emerges that is connected to an outlet line that is routed through shaft 10. Outlet opening 54 is closed to a greater or lesser degree by sensing piston 50, depending upon the axial position the sensing piston.

Sensing chamber 52 is connected through connecting lines (not shown) to a moment chamber 56 that is formed between support member 16 and an axial collar of movable disk 14. A seal is positioned between the cylindrical region 20 of support member 16 and an outer surface of the axial shoulder of movable disk 14. Radially outside of moment chamber 56 an adjustment chamber 58 is formed between cylindrical region 20 and radial wall 22 of support member 16 and the back side of movable disk 14 that faces opposite to axially fixed disk 12. Adjustment chamber 58 is sealed off radially outwardly by a seal 60 that seals between the outer surface of radial wall 22 of support member 16 and cylinder 44.

The function of the described arrangement is as follows:

An endless torque-transmitting means circulates between the conical surfaces facing each other of fixed disk 12 and movable disk 14, and also around another coaxial conical disk pair that has an axis that is radially offset from the axis of conical disk pair 12,14. The transmission ratio of the belt-driven conical-pulley transmission is adjusted in a known manner by adjusting the spacing between the conical disks of the disk pairs in opposite directions. With the aid of the geometry of ramp surfaces 26 and 32, the torque sensor formed by the components 28, 30, and 34 uses an input torque that is introduced through drive wheel 24 to produce an axial force that acts on second ramp component 30. Sensing piston 50 is displaced by that axial force, and as the sensing piston moves to the right (with reference to FIG. 1) it increasingly closes outlet opening 54. That causes a resistance to form for the hydraulic fluid under pressure with which sensing chamber 52 is constantly charged. In that way, a pressure that is a function of the input torque develops within sensing chamber 52, and within moment chamber 56 which is connected to it.

Sensing chamber 52 is bounded toward the right (with reference to FIG. 1) by support member 16, which is rigidly connected to shaft 10, and toward the left by sensing piston 50, which has a defined effective region on which the pressure in sensing chamber 52 acts. That pressure, multiplied by the effective area of the sensing piston, provides an opposing force to the axial force produced by the input torque, which opposing force is applied to sensing piston 50 by second ramp component 30 through the intermediate arrangement of transmitting component 40.

The torque-dependent pressure in sensing chamber 52 is also operative in moment chamber 56 and acts there on the effective area of movable disk 14, so that a torque-dependent contact force is produced between movable disk 14 and the endless torque-transmitting means (not shown). Hydraulic pressure that is fed to adjusting chamber 58 serves to adjust the axial spacing between disks 12 and 14.

With the system described up to this point it is thus possible to produce a contact force that is applied to the endless torque-transmitting means between the conical disks that is proportional to the input torque.

Due to wear and energy usage, it is advisable to not impose unnecessarily high contact forces on the endless torque-transmitting means. At the same time, the contact force necessary in underdrive mode is appropriately greater than that necessary in overdrive mode at the same torque.

Figure 2:
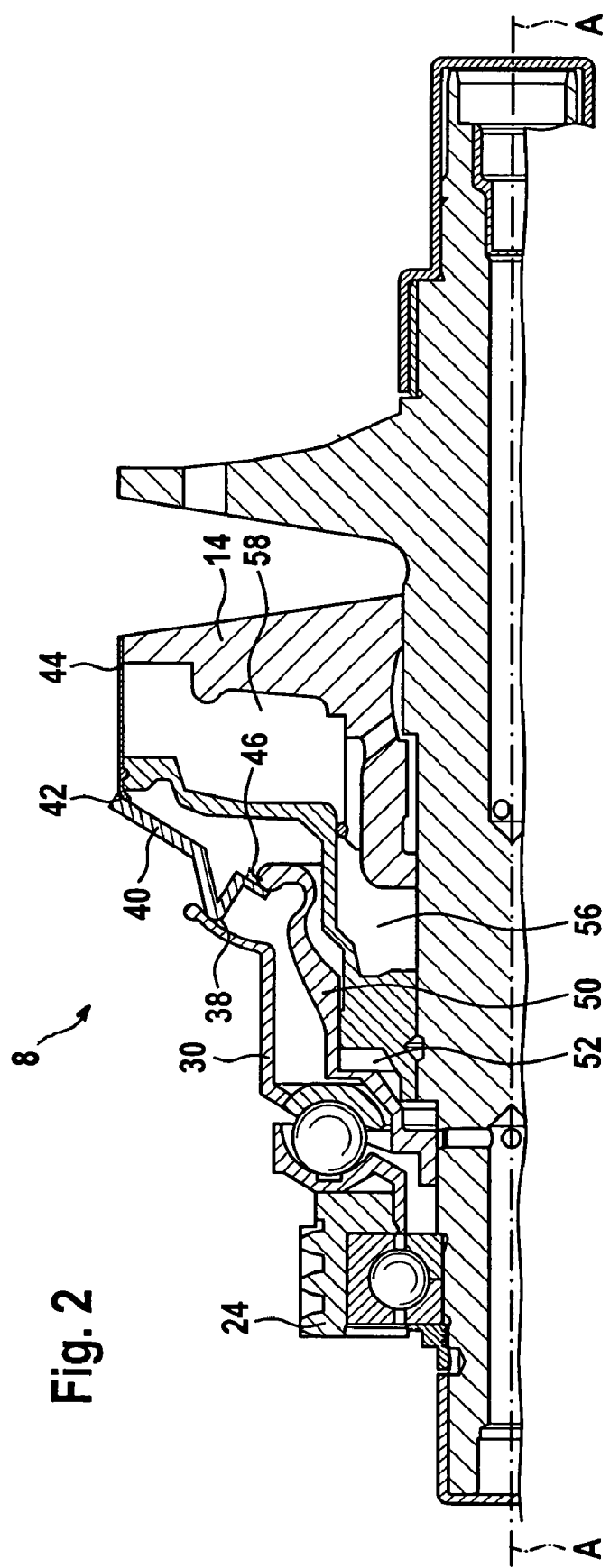
FIG. 2 shows the conical pulley of FIG. 1 when in the overdrive range.

In accordance with the invention, the contact force can be modified as a function of the transmission ratio, in addition to as a function of the input torque, by means of transmitting component 40. That transmission-ratio-dependent modification of the contact force takes place as follows:

FIG. 1 shows the conical pulley assembly 8 in the underdrive state, i.e., with the maximum spacing between conical disks 12 and 14. FIG. 2 shows the conical pulley assembly 8 in the overdrive state, i.e., with the minimum spacing between conical disks 12 and 14. Only the reference numerals necessary to explain the invention are provided in FIG. 2.

As can be seen directly from the drawing figures, in FIG. 1 the spacing between the first support point 38 and the pivot point 42 is essentially exactly the same as the spacing between the second support point 46 and the pivot point 42, so that the axial force operating from ramp component 30 is transmitted to sensing piston 50 essentially at one to one.

In the overdrive state of FIG. 2, in which transmitting component 40 is pivoted in the clockwise direction in consequence of the axial shifting of movable disk 14 to the right, the spacing between first support point 38 and pivot point 42 is smaller than the spacing between second support point 46 and pivot point 42, so that transmitting component 40 acts as a lever that translates the axial force transmitted by ramp component 30 to sensing piston 50, i.e., reduces it in the illustrated example, so that a reduced pressure prevails in sensing chamber 52 or in moment chamber 56 when the input torque acting on drive wheel 24 is the same.

Figure 3:
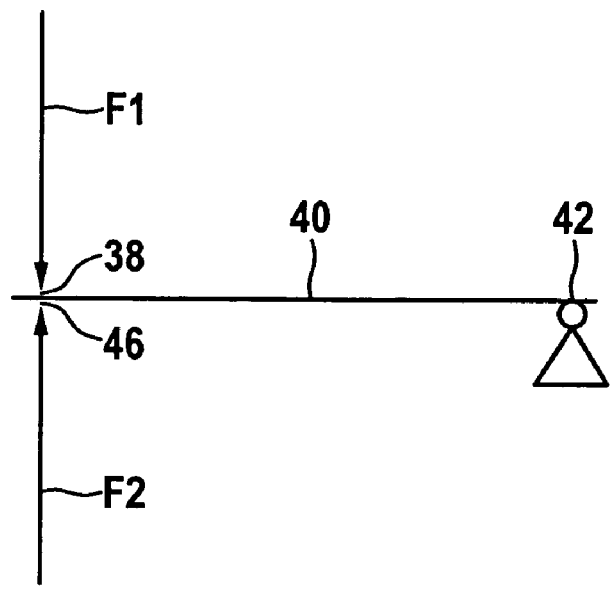
FIGS. 3 and 4 are schematic representations of forces acting within the conical pulley shown in FIG. 1.
Figure 4:
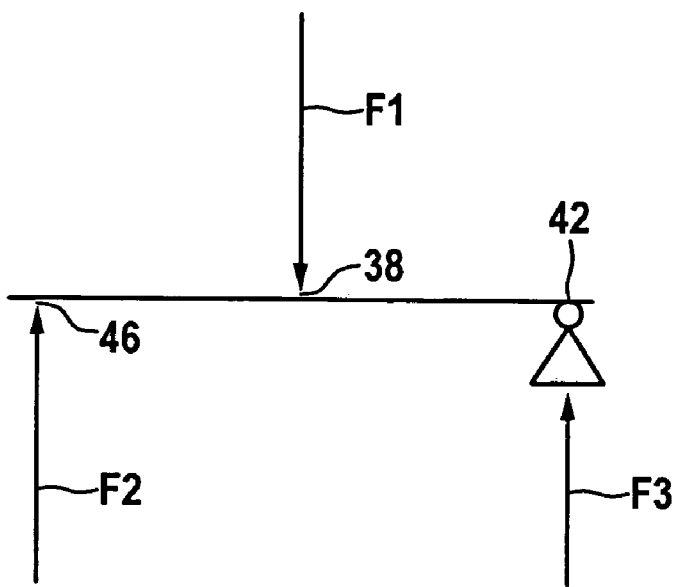

FIGS. 3 and 4 illustrate the relationships between the contact points and the pivot point, with transmitting component 40 shown as a straight lever. The relationships of FIG. 1 correspond to the schematic illustration in FIG. 3, in which the force F1 transmitted from second ramp component 30 operates on the same line of action as the force F2 acting from sensing piston 50. The relationships of FIG. 2 are shown schematically in FIG. 4. Force F1 is distributed between an opposing force F2 and an additional force F3 that acts on cylinder 44 and movable disk 14 through pivot point 42.

Through appropriate design of the geometry of transmitting component 40 and the surfaces at support region 36 and at the free end of transmitting component 40, along which second support point 46 moves, it is possible to achieve a desired division of the force operating from second ramp component 30 on sensing piston 50 as a function of the transmission ratio. As can be seen from the drawings, force F3 contributes to the contact pressure that is exerted by axially movable disk 14 on the endless torque-transmitting means. That is only a very small part of the total contact force, however, due to the greatly differing effective areas on sensing piston 50 and on axially movable disk 14.

Transmitting component 40, which is responsible for bringing about the translation of the axial force operating from second ramp component 30 in the manner of a lever, which can be executed in various ways, for example as an annular component from which tongues extend, can be constructed overall as a diaphragm spring.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A conical pulley assembly with integrated torque sensor, for a belt-driven conical-pulley transmission, said pulley assembly comprising:

a shaft with an axially fixed conical disk;

an axially movable conical disk that is non-rotatably and axially movably connected to the shaft in a direction toward and away from the axially fixed conical disk;

a drive element for introducing an input torque, wherein the drive element is connected to the shaft so that it is axially immovable and is rotatable relative to the shaft, the drive element including a first ramp component with a first ramp surface;

a second ramp component having a second ramp surface that is opposed to and is spaced from the first ramp surface by intervening rolling elements, wherein the second ramp component is shiftable axially relative to the shaft as a function of an input torque;

a support member that is rigidly connected to the shaft, a sensing piston carried by the shaft between the second ramp component and the support member and axially movable relative to the shaft, between which sensing piston and the support member a sensing chamber is formed that is supplied with pressurized hydraulic fluid and that communicates with a fluid outlet in the shaft whose effective cross-sectional area changes as a function of the position relative to the fluid outlet of the sensing piston along the shaft; and a transmitting component carried by and axially movable with the axially movable disk and in contact with the sensing piston and with the second ramp component to transmit to the sensing piston an axial movement of the second ramp component, so that a transmission ratio change as a function of the axial position of the axially movable conical disk results in a change in an axial force transmitted by the second ramp component to the sensing piston to change the hydraulic pressure that prevails in the sensing chamber.

2. A conical pulley assembly with integrated torque sensor, for a belt-driven conical-pulley transmission, said pulley assembly comprising:

a shaft with an axially fixed conical disk;

an axially movable conical disk that is non-rotatably and axially movably connected to the shaft in a direction toward and away from the axially fixed conical disk;

a drive element for introducing an input torque, wherein the drive element is connected to the shaft so that it is axially immovable and is rotatable relative to the shaft, the drive element including a first ramp component with a first ramp surface;

a second ramp component having a second ramp surface that is opposed to and is spaced from the first ramp surface by intervening rolling elements, wherein the second ramp component is shiftable axially relative to the shaft as a function of an input torque, a support member that is rigidly connected to the shaft, a sensing piston carried by the shaft between the second ramp component and the support member and axially movable relative to the shaft, between which sensing piston and the support member a sensing chamber is formed that is supplied with pressurized hydraulic fluid and that communicates with a fluid outlet in the shaft whose effective cross-sectional area changes as a function of the position relative to the fluid outlet of the sensing piston along the shaft; and a transmitting component carried by the axially movable disk and in contact with the sensing piston and with the second ramp component to transmit to the sensing piston an axial movement of the second ramp component, so that a transmission ratio change as a function of the axial position of the axially movable conical disk results in a change in an axial force transmitted by the second ramp component to the sensing piston to change the hydraulic pressure that prevails in the sensing chamber, wherein the transmitting component is pivotable relative to the movable disk about a pivot point and is formed in such a manner that a ratio of a distance between a point of contact of the transmitting component with the second ramp component and the pivot point to a distance between a point of contact of the transmitting component with the sensing piston and the pivot point changes as a function of the axial position of the axially movable disk.

3. A conical pulley assembly in accordance with claim 1, wherein the transmitting component is attached to a cylindrical member that is rigidly connected to the movable disk, wherein the support member is axially sealingly movable relative to the cylindrical member.

4. A conical pulley assembly in accordance with claim 1, wherein the transmitting component is a diaphragm spring.

* * * * *